Figure 1:
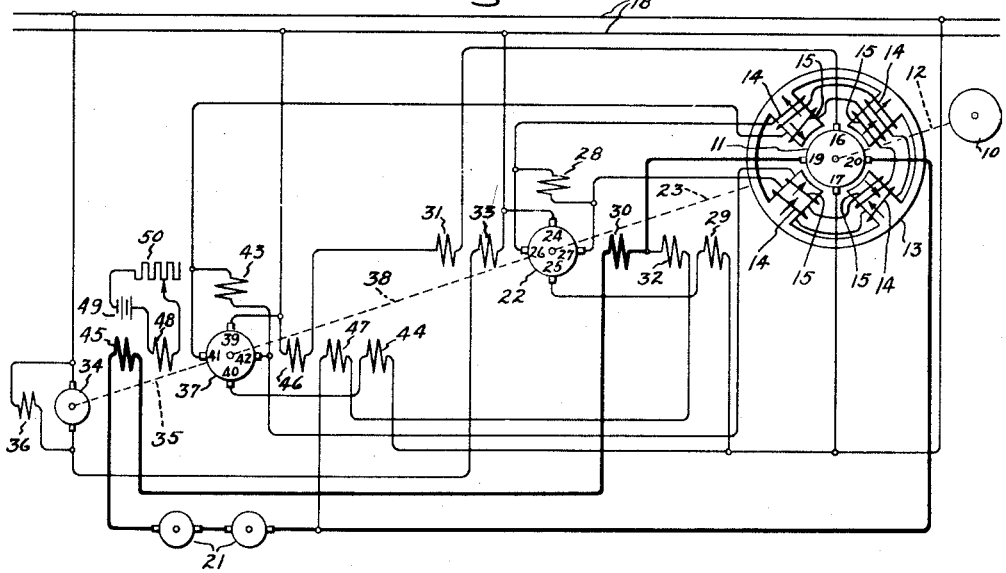

May 4, 1937.  G. M. PESTARINI  2,079,465

POWER SYSTEM

Filed Aug. 24, 1936

Inventor:
Giuseppe M. Pestarini,
by Harry E. Dunham
His Attorney.

Patented May 4, 1937

2,079,465

UNITED STATES PATENT OFFICE 2,079,465

POWER SYSTEM

Giuseppe M. Pestarini, Turin, Italy

Application August 24, 1936, Serial No. 97,664
In Germany August 24, 1935

17 Claims. (Cl. 172—239)

My invention relates to electrical power systems utilizing direct current commutator dynamo-electric machines of the metadyne type.

A direct current machine of the metadyne type is a dynamo-electric machine which may be operated as a motor, a generator, or a rotary transformer. Essentially, a metadyne is a direct current dynamo-electric machine having a rotor or armature provided with windings and a commutator of the conventional direct current dynamo-electric machine type, and a stationary member affording a path of low magnetic reluctance to the magnetic fluxes set up by the armature currents. The commutator of a bipolar machine usually is provided with two brush sets electrically displaced from each other for providing a primary circuit and a secondary circuit through the metadyne rotatable member or armature. One of these brush sets is connected across a substantially constant potential source of electrical power supply, and the other brush set carries a direct current of substantially constant magnitude. In some cases the primary circuit may be short-circuited instead of being connected to a source of electrical power supply. The stationary member of the metadyne also may be provided with various field exciting windings arranged to provide the metadyne with special characteristics and to insure the stability of the machine.

An object of my invention is to provide an electrical system in which the excitation system of direct current dynamo-electric machines of the metadyne type is more readily controlled, and in which the copper requirements of the machines are reduced, and, consequently, their efficiencies are improved. In order to simplify the excitation system and reduce the copper requirements of a metadyne dynamo-electric machine, I provide two sets of windings associated with the stationary member, arranged to produce fluxes having resultant magnetic axes displaced substantially ninety electrical degrees with respect to each other. Each of these sets of windings is energized by a separate auxiliary dynamo-electric machine, such as a metadyne, and their energization is regulated by controlling the electrical characteristic of the auxiliary machines by special windings on the auxiliary machines. In this manner, the excitation along the two magnetic axes of the main metadyne machine may be much smaller than would otherwise be required, if the main metadyne machine were provided with each of the field exciting windings necessary to obtain the desired characteristics of the system.

Further objects and advantages of my invention will become apparent in the following description referring to the accompanying drawing, and the features of novelty which characterize my invention will be pointed out with particularity in the claims annexed to and forming a part of this specification.

Figure 2:
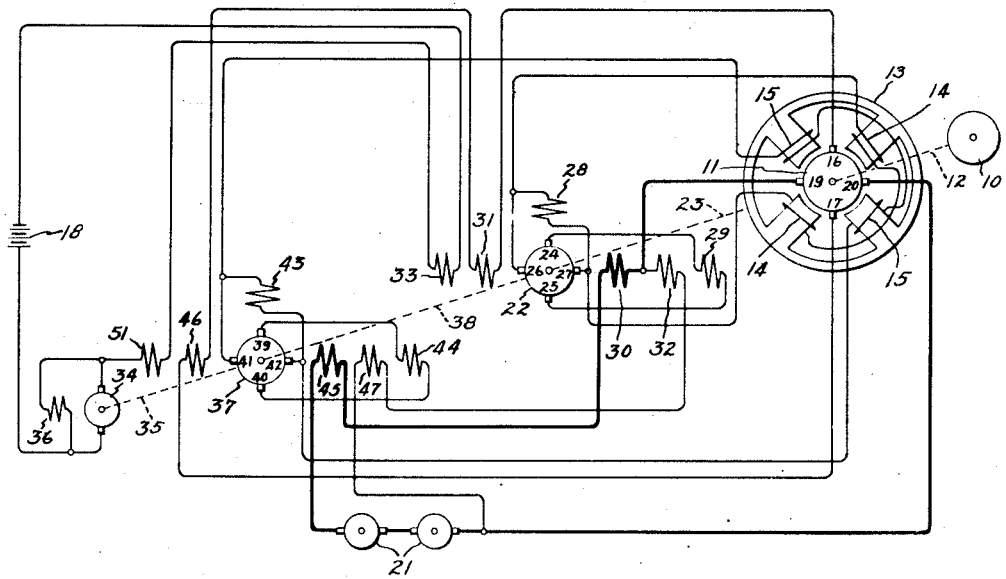

For a better understanding of my invention, reference is made to the accompanying drawing, wherein Fig. 1 is a schematic diagram illustrating a power system in which a metadyne is provided with my improved excitation system, and the primary brushes of the main machine are connected to a constant potential source of electrical power supply; and Fig. 2 is a schematic diagram of a modification of the power system shown in Fig. 1.

Referring to the drawing, the power system illustrated in Fig. 1 includes a prime mover 10 of any suitable type, such as an electric motor, an internal combustion or steam engine, or a turbine, arranged to drive a main metadyne dynamo-electric machine armature 11 through a shaft 12. The main metadyne is provided with a stationary member 13, on which a set of four field exciting windings 14 is arranged to provide a flux having its resultant magnetic axis along the primary commutating axis of the brushes 16 and 17 of the armature 11, and a set of four field exciting windings 15 arranged to provide a flux having its resultant magnetic axis along the secondary commutating axis of the brushes 19 and 20 of the armature 11. The armature is provided with two sets of brushes which are displaced ninety electrical degrees from each other; one of these sets of brushes 16 and 17 is connected to a substantially constant potential source of direct current electrical power supply 18, and provides a primary circuit through the armature 11. The other set of brushes 19 and 20 is connected to an electrical load including motors 21, and provides a secondary circuit through the armature 11.

The energization of each set of windings 14 and 15 is controlled by a separate auxiliary metadyne dynamo-electric machine. One of these machines is arranged to control the excitation along the primary commutating axis of the main metadyne machine, and is provided with an armature 22 mechanically driven by a shaft 23 from the main metadyne machine armature 11. The armature 22 is provided with a primary brush set, including brushes 24 and 25, connected across the constant potential source of electrical power supply 18 for providing a primary circuit through the armature 22, and a secondary brush set, including brushes 26 and 27, displaced substantially ninety electrical degrees from the primary brushes 24 and 25, and connected across the set of main metadyne machine field exciting windings 14 for providing a secondary circuit through the armature 22. The voltage across the secondary brushes 26 and 27 of the auxiliary metadyne machine is controlled by various field exciting windings, some of which are provided for obtaining certain desired operating characteristics of the machines, and others of which are provided for insuring stability of the main and auxiliary metadyne machines during operation thereof. One of these field exciting windings 28 is arranged to provide a component of magnetic excitation along the primary commutating axis of the auxiliary metadyne machine armature 22, and is connected across the auxiliary secondary brushes 26 and 27. This winding provides a flux which induces an electromotive force between the secondary brushes 26 and 27, which opposes the voltage producing a current flow between these brushes. Another field exciting winding 29 is connected in series with the primary brushes 24 and 25 and across the source of electrical power supply 18, so that its energization is dependent upon the current in the auxiliary metadyne machine armature primary circuit. This winding is arranged along the secondary commutating axis of the auxiliary metadyne machine armature 22 and induces an electromotive force between the primary brushes 24 and 25, which is opposed to the voltage producing an electric current flow between these brushes. These two windings, 28 and 29, insure the stability of the auxiliary metadyne machine by damping out any transient or parasitic currents which may transverse the armature 22. The operation of these windings is also explained in my United States Patent No. 2,038,384, April 21, 1936.

In order to insure the stability of the main metadyne dynamo-electric machine, it is desirable that a component of excitation should be provided along the primary commutating axis which will induce a component of voltage between the secondary brushes 19 and 20 opposing the voltage producing an electric current flow between these brushes, and thereby damping out any transient or parasitic currents which may flow therebetween. In order to obtain this component of excitation in the main metadyne machine, a field exciting winding 30 is arranged to provide a component of magnetic excitation along the secondary commutating axis of the auxiliary metadyne machine armature 22. This winding 30 is connected in series with the secondary brushes 19 and 20 of the main metadyne machine and the load comprising motors 21, so that it is energized in accordance with the current flowing between the main metadyne machine secondary brushes. The winding 30 is arranged to control the primary current of the auxiliary metadyne machine armature 22 to induce a component of voltage between the secondary brushes 26 and 27. The brushes 26 and 27 are connected across the set of field exciting windings 14 in such manner as to induce a voltage between the main metadyne machine secondary brushes 19 and 20, opposed to the voltage producing a current flow between the brushes 19 and 20. Another field exciting winding 31 is arranged to produce a component of magnetic excitation along the secondary commutating axis of the auxiliary armature 22 and is connected in series with the main metadyne primary brushes 16 and 17 and across the source of electrical power supply 18. The winding 31 is arranged to induce a component of voltage in the auxiliary metadyne machine armature 22, which is proportional to the main metadyne primary current, and this component of voltage is in such a direction that it provides a component of energization to the field exciting windings 14 inducing a component of voltage between the secondary brushes 19 and 20 in the same direction as the voltage producing an electrical current flow between these brushes. This component of voltage in the main metadyne machine armature will cause a temporary variation in the main metadyne secondary current, which will correspondingly vary the main metadyne secondary armature reaction, and, thereby oppose the variation in the main metadyne primary armature current in proportion to the variation of this current, which varied the energization of the field exciting winding 31. Thus, it is readily seen that the field exciting winding 31 acts to damp out transient or parasitic currents which may occur in the primary circuit of the main metadyne armature 11 and, thereby, stabilizes the operation of this machine.

In certain instances, it may be desirable that the secondary current of the main metadyne dynamo-electric machine varies as a function of the secondary voltage. In order to obtain this relation, I provide a field exciting winding 32, which is arranged to provide a component of magnetic excitation along the secondary commutating axis of the auxiliary metadyne machine armature 22, and which is connected across the secondary brushes 19 and 20 of the main metadyne machine. In this manner, a component of electromotive force is induced in the auxiliary metadyne machine armature 22, which is dependent upon the secondary voltage of the main metadyne machine. The component of voltage produced by this winding 32 affects the energization of the field exciting windings 14, and produces a corresponding variation in the primary excitation of the main metadyne machine armature 11, and, consequently, regulates the main metadyne secondary current.

It is often desirable that the output of the main metadyne machine be maintained in a certain relation to the speed of the prime mover. In the case of a metadyne transformer, it is desirable that the prime mover speed be maintained substantially constant, while in the case of a metadyne generator, it is desirable that the output of the generator be maintained in a certain relation with respect to the prime mover output and speed. In order to obtain this regulation, I provide a field exciting winding 33, the energization of which is controlled by a regulator generator 34. The armature of the regulator generator 34 is driven in a predetermined speed relation to the speed of the prime mover 10 and the main metadyne machine armature 11 by a mechanical connection including a shaft 35, and is provided with a shunt field exciting winding 36. The regulator generator 34 is connected to the source of electrical power supply in opposition to the voltage thereof, and across the field exciting winding 33. This regulator generator is constructed to operate in its magnetically unsaturated range so that the energization of the field exciting winding 33 will be in one direction or another, and varied in magnitude, depending upon the speed of the prime mover 10. Thus, the energization of the field exciting winding 33 induces a component electromotive force in the auxiliary metadyne armature 22, which produces a corresponding component of magnetic excitation along the main metadyne primary commutating axis, dependent upon the speed of the prime mover, and, therefore, controls the main metadyne secondary voltage and the load upon the prime mover 10. The operation of this regulator generator and field exciting winding is also described in my United States Patent No. 2,030,652, February 11, 1936.

The excitation along the secondary commutating axis of the main metadyne machine armature 11 is controlled by the set of field exciting windings 15, which are energized by a second auxiliary metadyne dynamo-electric machine having an armature 37 mechanically coupled by a shaft 38 to the auxiliary metadyne dynamo-electric machine armature 22. The auxiliary metadyne machine armature 37 is provided with a primary brush set, including brushes 39 and 40 connected across the constant potential source of electrical power supply 18 for providing a primary circuit through the armature 37, and a secondary brush set, including brushes 41 and 42, displaced substantially ninety electrical degrees from the primary brushes 39 and 40 and connected across the main metadyne field exciting winding 15 for providing a secondary circuit through the armature 37. The voltage across the secondary brushes 41 and 42 is controlled by various stator field exciting windings similar to the field exciting windings provided for the auxiliary metadyne dynamo-electric machine 22. One of these field exciting windings 43 is arranged to provide a component of magnetic excitation along the primary commutating axis of the auxiliary metadyne machine armature 37, and is connected across the auxiliary machine secondary brushes 41 and 42 in order to damp out transient and parasitic currents which might occur in the secondary circuit of the auxiliary metadyne 37. The operation of this winding is the same as the operation of the winding 28 on the auxiliary metadyne machine 22. Another field exciting winding 44 is connected in series with the primary brushes 39 and 40 across the source of electrical power supply 18, so that its energization is dependent upon the current in the primary circuit of the auxiliary metadyne machine armature 37. The winding 44 is arranged to damp out any transient or parasitic currents which may transverse the primary circuit of the armature 37. The operation of this winding is the same as the operation of 29 on the auxiliary metadyne machine armature 22.

In order further to insure the stability of the main metadyne dynamo-electric machine, a field exciting winding 45 is arranged to provide a component of magnetic excitation along the secondary commutating axis of the auxiliary metadyne machine armature 37. This winding is connected in series with the secondary brushes 19 and 20 of the main metadyne machine and the load 21, so that it is energized in accordance with the current flowing between the main metadyne machine secondary brushes, and induces a component of voltage in the auxiliary metadyne machine armature 37. The armature 37 is connected across the set of field exciting windings 15 in such manner as to induce a voltage between the main metadyne primary brushes 16 and 17 in the same direction as the voltage produced by the armature reaction in the main metadyne armature 11 due to the current flow between the secondary brushes 19 and 20. The operation of this winding is similar to the operation of winding 31 on the auxiliary metadyne dynamo-electric machine 22. Another field exciting winding 46 is arranged to produce a component of magnetic excitation along the secondary commutating axis of the auxiliary metadyne armature 37, and is connected in series with the main metadyne machine primary brushes 16 and 17 and across the source of electrical power supply 18. This winding 46 is arranged to induce a component of voltage in the auxiliary metadyne machine armature 37, which will energize the field exciting windings 15 so as to induce a voltage between the main metadyne machine primary brushes 16 and 17 opposed to the voltage producing a current flow between these brushes, and, in this manner, damps out transient and parasitic currents flowing between these brushes. The operation of this winding is similar to the operation of winding 30 on the auxiliary metadyne dynamo-electric machine 22. Another field exciting winding 47 is arranged to provide a component of magnetic excitation along the secondary commutating axis of the auxiliary metadyne machine armature 37, and is connected across the secondary brushes 19 and 20 of the main metadyne machine in series with the field exciting winding 32. This field exciting winding 47 operates in the same manner as the field exciting winding 32 on the auxiliary metadyne dynamo-electric machine 22, and induces a component of voltage in the armature 37 affecting the energization of the field exciting windings 15, and in such a manner that the primary current of the main metadyne machine armature 11, and consequently, the secondary current of the main metadyne machine armature 11 varies as a function of the main metadyne machine secondary voltage.

In some instances, it may be desirable to further control the excitation along the secondary commutating axis of the main metadyne dynamo-electric machine. In order to do this, a field exciting winding 48 is provided, which is excited from a separate source of electrical power supply, such as a battery 49, and is connected thereto by a current regulating device, such as a variable resistance 50. This field exciting winding 48 is arranged to provide a component of magnetic excitation along the secondary commutating axis of the auxiliary metadyne machine armature 37, and thereby regulates the energization of the field exciting windings 15 of the main metadyne dynamo-electric machine.

The system illustrated in Fig. 1 may be used as a rotary transformer, or as a generator. If the main metadyne dynamo-electric machine operates as a rotary transformer, electrical power is taken from the source of electrical power supply 18 at a substantial constant potential and variable current according to the load requirements, and is transformed into a direct current of substantially constant magnitude and variable voltage. When operating in this manner it is desirable that the armature 11 be rotated at a substantially constant speed, and the prime mover 10 would be a constant speed motor or the like. Since the main and auxiliary metadyne machines and the regulator generator are all mechanically coupled to the prime mover 10, they are driven in a predetermined speed relation with respect to each other and the prime mover 10.

Since all of the field exciting windings which provide excitation to the auxiliary metadyne machine armature 22 affect the energization of the field exciting windings 14, which control the excitation along the primary commutating axis of the main metadyne machine, the control of the excitation of the auxiliary metadyne machine armature 22 regulates the excitation along the primary commutating axis of the main metadyne machine and, in this manner, controls the characteristics of the secondary circuit of the main metadyne machine. Thus, if the load upon the rotary transformer varies, and its speed tends to vary inversely as the load on the machine, the speed of the regulator generator will also vary inversely as the load upon the machine, and the voltage impressed upon the field exciting winding 33 will vary inversely as the speed variation of the system. This variation of the energization of the field exciting winding 33 will produce a variation in excitation along the primary commutating axis of the main metadyne machine 11 in such a manner that the secondary current will tend to vary inversely with respect to the transient load variation, so that the secondary current of the main metadyne machine remains substantially constant. The excitation along the secondary commutating axis of the main metadyne machine 11 is controlled by the set of field exciting windings 15 which is energized in accordance with the voltage across the secondary brushes 41 and 42 of the auxiliary metadyne machine 37. By regulating the excitation of the auxiliary metadyne 37 by the various field exciting windings on this machine, the desired relationship between the secondary characteristics of the main metadyne dynamo-electric machine, and the characteristics of the primary circuit of the main metadyne machine, are readily controlled.

When the system illustrated in this figure operates as a generator, the prime mover 10 supplies the power to the system, and the source of electrical power supply 18 is utilized to maintain a substantially constant voltage across the primary brushes of the main and auxiliary metadyne machines. As in the case of a rotary transformer, the secondary characteristics of the main metadyne are controlled by regulating the excitation along the primary commutating axis of the main metadyne machine. This excitation is controlled by varying the energization of the set of field exciting windings 14, which is dependent upon the voltage across the secondary brushes 26 and 27 of the auxiliary metadyne machine armature 22, and which is in turn controlled by the various field exciting windings on this auxiliary metadyne machine. The desired relation between the secondary characteristics and the primary characteristics of the main metadyne generator is obtained by controlling the excitation along the secondary commutating axis of the main metadyne machine. This excitation is regulated by the energization of the field exciting windings 15, which are controlled by the voltage across the secondary brushes 41 and 42 of the auxiliary metadyne machine 37. The voltage across these secondary brushes is dependent upon the excitation of the auxiliary machine 37, which is controlled by the various field exciting windings on this machine. In this manner the desired characteristics of the main metadyne generator are readily controlled by varying the excitation along its primary and secondary commutating axes by controlling the excitation of the auxiliary metadyne machines 22 and 37.

In general, the power system illustrated in Fig. 2 is similar to the power system shown in Fig. 1, and the same reference characters have been used to designate similar parts. The main metadyne dynamo-electric machine in Fig. 2 is only provided with two field exciting windings 14 and two field exciting windings 15. The field exciting windings 14 are arranged along one diametrical axis for controlling the excitation along the primary commutating axis of the machine, and the field exciting windings 15 are arranged along another diametrical axis displaced substantially ninety electrical degrees from the axis of the field exciting windings 14, for controlling the magnetic excitation along the secondary commutating axis of the main metadyne machine. In this system all of the primary brushes of the metadyne machines are short-circuited through low resistance field exciting windings arranged on the auxiliary metadyne machines 22 and 37. This provides all of the metadyne machines with drooping voltage-current characteristics, as described in my United States Patent No. 2,038,384, April 21, 1936. The arrangement of the field exciting windings on the auxiliary metadyne machines is substantially the same as in Fig. 1, but in this system the field exciting windings, which are energized in accordance with the current in the primary circuits of the metadyne machines, are connected directly across the primary brushes of the metadyne machines. Thus, field exciting windings 31 and 46 are connected in series across the primary brushes 16 and 17 of the main metadyne dynamo-electric machine, the field exciting winding 29 is connected across the primary brushes 24 and 25 of the auxiliary metadyne dynamo-electric machine 22, and the field exciting winding 44 is connected across the primary brushes 39 and 40 of the auxiliary metadyne dynamo-electric machine 37. In this system the auxiliary metadyne dynamo-electric machine 37 also is provided with a field exciting winding 51 arranged to provide a component of magnetic excitation along the secondary commutating axis of the auxiliary metadyne machine 37, and is energized in the same manner as the field exciting winding 33 of the auxiliary metadyne dynamo-electric machine 22, for regulating the speed-load characteristic of the system.

The operation of this system is essentially the same as the system shown in Fig. 1, but it has the additional advantage of not requiring a large separate source of electrical power supply, as in this arrangement it may comprise an electric storage battery 18 for maintaining substantially constant voltage in opposition to the voltage of the auxiliary dynamo-electric machine 34 which is used to regulate the speed of the system as has been explained with reference to Fig. 1.

Modifications of the circuit arrangements which I have described will occur to those skilled in the art. I desire it to be understood, therefore, that my invention is not to be limited to the particular embodiments set forth, and I intend in the appended claims to cover all modifications which do not depart from the spirit and scope of my invention.

What I claim as new and desire to secure by Letters Patent of the United States is:

1. An electrical system including a main metadyne dynamo-electric machine having an armature, means including a primary brush set and a secondary brush set associated with said armature for providing a primary circuit and a secondary circuit therethrough, said secondary brush set being electrically displaced from said primary brush set, a field exciting winding arranged to produce a component of magnetic excitation along the primary commutating axis of said main metadyne dynamo-electric machine, means including an auxiliary dynamo-electric machine for controlling the energization of said field exciting winding, a second field exciting winding arranged to produce a component of magnetic excitation along the secondary commutating axis of said main metadyne dynamo-electric machine, and means including a second auxiliary dynamo-electric machine for controlling the energization of said second field exciting winding.

2. An electrical system including a main metadyne dynamo-electric machine having an armature, means including a primary brush set and a secondary brush set associated with said armature for providing a primary circuit and a secondary circuit therethrough, said secondary brush set being electrically displaced from said primary brush set, a field exciting winding arranged to produce a component of magnetic excitation along the primary commutating axis of said main metadyne dynamo-electric machine, means including an auxiliary metadyne dynamo-electric machine for controlling the energization of said field exciting winding, a second field exciting winding arranged to produce a component of magnetic excitation along the secondary commutating axis of said main metadyne dynamo-electric machine, and means including a second auxiliary metadyne dynamo-electric machine for controlling the energization of said second field exciting winding.

3. An electrical system including a main metadyne dynamo-electric machine having an armature, means including a primary brush set and a secondary brush set associated with said armature for providing a primary circuit and a secondary circuit therethrough, said secondary brush set being electrically displaced from said primary brush set, a field exciting winding arranged to produce a component of magnetic excitation along the primary commutating axis of said main metadyne dynamo-electric machine, means including an auxiliary metadyne dynamo-electric machine for controlling the energization of said field exciting winding, means dependent upon an electrical characteristic of one of said main metadyne armature circuits for regulating the excitation of said auxiliary metadyne dynamo-electric machine, a second field exciting winding arranged to produce a component of magnetic excitation along the secondary commutating axis of said main metadyne dynamo-electric machine, means including a second auxiliary metadyne dynamo-electric machine for controlling the energization of said second field exciting winding, and means dependent upon an electrical characteristic of another of said main metadyne armature circuits for regulating the excitation of said second auxiliary metadyne dynamo-electric machine.

4. An electrical system including a main metadyne dynamo-electric machine having an armature, means including a primary brush set and a secondary brush set associated with said armature for providing a primary circuit and a secondary circuit therethrough, said secondary brush set being electrically displaced from said primary brush set, a field exciting winding arranged to produce a component of magnetic excitation along the primary commutating axis of said main metadyne dynamo-electric machine, an auxiliary metadyne dynamo-electric machine, means including a second field exciting winding energized in accordance with the current in said secondary circuit for providing a component of magnetic excitation to said auxiliary metadyne dynamo-electric machine, means connecting said auxiliary metadyne dynamo-electric machine across said main metadyne field exciting winding for inducing a component of voltage between said secondary brush set in opposition to the voltage producing an electric current flow therebetween, a third field exciting winding arranged to produce a component of magnetic excitation along the secondary commutating axis of said main metadyne dynamo-electric machine, a second auxiliary metadyne dynamo-electric machine, means including a fourth field exciting winding energized in accordance with the current in said primary circuit for providing a component of magnetic excitation to said second auxiliary metadyne dynamo-electric machine, and means connecting said second auxiliary metadyne dynamo-electric machine across said third field exciting winding for inducing a component of voltage between said primary brush set in opposition to the voltage producing a current flow therebetween.

5. An electrical system including a main metadyne dynamo-electric machine having an armature, means including a primary brush set and a secondary brush set associated with said armature for providing a primary circuit and a secondary circuit therethrough, said secondary brush set being electrically displaced from said primary brush set, a field exciting winding arranged to produce a component of magnetic excitation along the primary commutating axis of said main metadyne dynamo-electric machine, an auxiliary metadyne dynamo-electric machine, means for connecting said auxiliary metadyne dynamo-electric machine across said main metadyne dynamo-electric machine field exciting winding, means including a second field exciting winding arranged to provide a component of magnetic excitation to said auxiliary metadyne dynamo-electric machine dependent upon the current in said secondary circuit and utilizing said connection of said auxiliary metadyne dynamo-electric machine across said main metadyne dynamo-electric machine field exciting winding for inducing a component of voltage between said secondary brush set in opposition to the voltage producing an electric current flow therebetween, a third field exciting winding arranged to produce a component of magnetic excitation along the secondary commutating axis of said main metadyne dynamo-electric machine, a second auxiliary metadyne dynamo-electric machine, means for connecting said second auxiliary metadyne dynamo-electric machine across said third field exciting winding, and means including a fourth field exciting winding arranged to provide a component of magnetic excitation to said second auxiliary metadyne dynamo-electric machine dependent upon the current in said primary circuit and utilizing said connection of said second auxiliary metadyne dynamo-electric machine across said third field exciting winding for inducing a component of voltage between said primary brush set in opposition to the voltage producing an electric current flow therebetween.

6. An electrical system including a main metadyne dynamo-electric machine having an armature, means including a primary brush set and a secondary brush set associated with said armature for providing a primary circuit and a secondary circuit therethrough, said secondary brush set being electrically displaced from said primary brush set, a field exciting winding arranged to produce a component of magnetic excitation along the primary commutating axis of said main metadyne dynamo-electric machine, an auxiliary metadyne dynamo-electric machine, means including a second field exciting winding energized in accordance with the current in said secondary circuit for providing component of magnetic excitation to said auxiliary metadyne dynamo-electric machine, means connecting said auxiliary metadyne dynamo-electric machine across said main metadyne field exciting winding for inducing a component of voltage between said secondary brush set in opposition to the voltage producing an electric current flow therebetween, a third field exciting winding arranged to provide a component of magnetic excitation to said auxiliary metadyne dynamo-electric machine, means for energizing said third field exciting winding in accordance with the electrical potential across said secondary brush set, a fourth field exciting winding arranged to produce a component of magnetic excitation along the secondary commutating axis of said main metadyne dynamo-electric machine, a second auxiliary metadyne dynamo-electric machine, means including a fifth field exciting winding energized in accordance with the current in said primary circuit for providing a component of magnetic excitation to said second auxiliary metadyne dynamo-electric machine, means connecting said second auxiliary metadyne dynamo-electric machine across said fourth field exciting winding for inducing a component of voltage between the said primary brush set in opposition to the voltage producing an electric current flow therebetween, a sixth field exciting winding arranged to provide a component of magnetic excitation to said second auxiliary metadyne dynamo-electric machine, and means for energizing said sixth field exciting winding in accordance with the voltage across said secondary brush set.

7. A power system including a prime mover and a main metadyne dynamo-electric machine having an armature driven by said prime mover, means including a primary brush set and a secondary brush set associated with said armature for providing a primary circuit and a secondary circuit therethrough, said secondary brush set being electrically displaced from said primary brush set, an electrical load, means for connecting said electrical load to said secondary brush set, a field exciting winding arranged to produce a component of magnetic excitation along the primary commutating axis of said main metadyne dynamo-electric machine, an auxiliary metadyne dynamo-electric machine, means including a second field exciting winding energized in accordance with the current in said secondary circuit for providing a component of magnetic excitation to said auxiliary metadyne dynamo-electric machine, means connecting said auxiliary dynamo-electric machine across said main metadyne field exciting winding for inducing a component of voltage between said secondary brush set in opposition to the voltage producing an electric current flow therebetween, a source of substantially constant potential electrical power supply, a third field exciting winding arranged to provide a component of magnetic excitation to said auxiliary metadyne dynamo-electric machine, a regulator generator, means for connecting said regulator generator in opposition to the voltage of said source of substantially constant potential electrical power supply and across said third field exciting winding, a fourth field exciting winding arranged to produce a component of magnetic excitation along the secondary commutating axis of said main metadyne dynamo-electric machine, a second auxiliary metadyne dynamo-electric machine, means including a fifth field exciting winding energized in accordance with the current in said primary circuit for providing a component of magnetic excitation to said second auxiliary metadyne dynamo-electric machine, and means connecting said second auxiliary metadyne dynamo-electric machine across said fourth field exciting winding for inducing a component of voltage between said primary brush set in opposition to the voltage producing an electric current flow therebetween.

8. A power system including a prime mover and a main metadyne dynamo-electric machine having an armature driven by said prime mover, means including a primary brush set and secondary brush set associated with said armature for providing a primary circuit and a secondary circuit therethrough, said secondary brush set being electrically displaced from said primary brush set, an electrical load, means for connecting said electrical load to said secondary brush set, a field exciting winding arranged to produce a component of magnetic excitation along the primary commutating axis of said main metadyne dynamo-electric machine, an auxiliary metadyne dynamo-electric machine, means including a second field exciting winding energized in accordance with the current in said secondary circuit for providing a component of magnetic excitation to said auxiliary metadyne dynamo-electric machine, means connecting said auxiliary dynamo-electric machine across said main metadyne field exciting winding for inducing a component of voltage between said secondary brush set in opposition to the voltage producing an electric current flow therebetween, a source of substantially constant potential electrical power supply, a third field exciting winding arranged to provide a component of magnetic excitation to said auxiliary metadyne dynamo-electric machine, a regulator generator, means for connecting said regulator generator in opposition to the voltage of said source of substantially constant potential electrical power supply and across said third field exciting winding, a fourth field exciting winding arranged to produce a component of magnetic excitation along the secondary commutating axis of said main metadyne dynamo-electric machine, a second auxiliary metadyne dynamo-electric machine, means including a fifth field exciting winding energized in accordance with the current in said primary circuit for providing a component of magnetic excitation to said second auxiliary metadyne dynamo-electric machine, means connecting said second auxiliary metadyne dynamo-electric machine across said fourth field exciting winding for inducing a component of voltage between said primary brush set in opposition to the voltage producing an electric current flow therebetween, and means for driving said main and auxiliary metadyne dynamo-electric machines and said regulator generator in a predetermined speed relation to the speed of said prime mover.

9. An electrical system including a main metadyne dynamo-electric machine having an armature, means including a primary brush set and a secondary brush set associated with said armature for providing a primary circuit and a secondary circuit therethrough, said secondary brush set being electrically displaced from said primary brush set, a field exciting winding arranged to produce a component of magnetic excitation along the primary commutating axis of said main metadyne dynamo-electric machine, an auxiliary metadyne dynamo-electric machine, means including a second field exciting winding energized in accordance with the electric current in said secondary circuit for providing a component of magnetic excitation to said auxiliary metadyne dynamo-electric machine, means connecting said auxiliary metadyne dynamo-electric machine across said main metadyne field exciting winding for inducing a component of voltage between said secondary brush set in opposition to the voltage producing an electric current flow therebetween, means including a third field exciting winding constructed and arranged to provide a component of magnetic excitation to said auxiliary metadyne dynamo-electric machine dependent upon the current in said primary circuit and utilizing said connection of said auxiliary metadyne dynamo-electric machine across said main metadyne dynamo-electric machine field exciting winding for inducing a component of voltage between said secondary brush set in the same direction as the voltage producing an electric current flow therebetween, a fourth field exciting winding arranged to produce a component of magnetic excitation along the secondary commutating axis of said main metadyne dynamo-electric machine, a second auxiliary metadyne dynamo-electric machine, means including a fifth field exciting winding energized in accordance with the current in said primary circuit for providing a component of magnetic excitation to said second auxiliary metadyne dynamo-electric machine, means connecting said second auxiliary metadyne dynamo-electric machine across said fourth field exciting winding for inducing a component of voltage-between said primary brush set in opposition to the voltage producing an electric current flow therebetween, and means including a sixth field exciting winding arranged to provide a component of magnetic excitation to said second auxiliary metadyne dynamo-electric machine dependent upon the current in said secondary circuit and utilizing said connection of said second auxiliary metadyne dynamo-electric machine across said fourth field exciting winding for inducing a component of voltage between the said primary brush set in opposition to the voltage producing an electric current flow therebetween.

10. An electrical system including a main metadyne dynamo-electric machine having an armature, means including a primary brush set and a secondary brush set associated with said armature for providing a primary circuit and a secondary circuit therethrough, said secondary brush set being electrically displaced from said primary brush set, a field exciting winding arranged to provide a component of magnetic excitation along the primary commutating axis of said main metadyne dynamo-electric machine, an auxiliary metadyne dynamo-electric machine having an armature, means including a second primary brush set and a second secondary brush set associated with said auxiliary metadyne dynamo-electric machine armature for providing a primary circuit and a secondary circuit therethrough, said second secondary brush set being electrically displaced from said second primary brush set, means including a second field exciting winding for providing a component of magnetic excitation along the secondary commutating axis of said auxiliary metadyne dynamo-electric machine in accordance with the current in said main metadyne secondary circuit, means connecting said second secondary brush set across said main metadyne dynamo-electric machine field exciting winding for inducing a component of voltage between said main metadyne secondary brush set in opposition to the voltage producing an electric current flow in said main metadyne secondary circuit, means including a third field exciting winding energized in accordance with the electric current in said auxiliary metadyne primary circuit for providing a component of magnetic excitation along the secondary commutating axis of said auxiliary metadyne dynamo-electric machine, a fourth field exciting winding arranged to produce a component of magnetic excitation along the secondary commutating axis of said main metadyne dynamo-electric machine, a second auxiliary metadyne dynamo-electric machine having an armature, means including a third primary brush set and a third secondary brush set associated with said second auxiliary metadyne armature for providing a primary circuit and a secondary circuit therethrough, said third secondary brush set being electrically displaced from said third primary brush set, means including a fifth field exciting winding energized in accordance with the current in said main metadyne primary circuit for providing a component of magnetic excitation along the secondary commutating axis of said second auxiliary metadyne dynamo-electric machine, means connecting said third secondary brush set across said fourth field exciting winding for inducing a component of voltage between said main metadyne primary brush set in opposition to the voltage producing an electric current flow in said main metadyne primary circuit, and means including a sixth field exciting winding energized in accordance with the current in said second auxiliary metadyne primary circuit for providing a component of magnetic excitation along the secondary commutating axis of said second auxiliary metadyne dynamo-electric machine.

11. An electrical system including a main metadyne dynamo-electric machine having an armature, means including a primary brush set and a secondary brush set associated with said armature for providing a primary circuit and a secondary circuit therethrough, said secondary brush set being electrically displaced from said primary brush set, a field exciting winding arranged to provide a component of magnetic excitation along the primary commutating axis of said main metadyne dynamo-electric machine, an auxiliary metadyne dynamo-electric machine having an armature, means including a second primary brush set and a second secondary brush set associated with said auxiliary metadyne dynamo-electric machine armature for providing a primary circuit and a secondary circuit therethrough, said second secondary brush set being electrically displaced from said second primary brush set, means including a second field exciting winding for providing a component of magnetic excitation along the secondary commutating axis of said auxiliary metadyne dynamo-electric machine in accordance with the current in said main metadyne secondary circuit, means connecting said second secondary brush set across said main metadyne dynamo-electric machine field exciting winding for inducing a component of voltage between said main metadyne secondary brush set in opposition to the voltage producing an electric current flow in said main metadyne secondary circuit, means including a third field exciting winding energized in accordance with the electrical potential across said second secondary brush set for providing a component of magnetic excitation along the primary commutating axis of said auxiliary metadyne dynamo-electric machine, a fourth field exciting winding arranged to produce a component of magnetic excitation along the secondary commutating axis of said main metadyne dynamo-electric machine, a second auxiliary metadyne dynamo-electric machine having an armature, means including a third primary brush set and a third secondary brush set associated with said second auxiliary metadyne armature for providing a primary circuit and a secondary circuit therethrough, said third secondary brush set being electrically displaced from said third primary brush set, means including a fifth field exciting winding energized in accordance with the current in said main metadyne primary circuit for providing a component of magnetic excitation along the secondary commutating axis of said second auxiliary metadyne dynamo-electric machine, means connecting said third secondary brush set across said fourth field exciting winding for inducing a component of voltage between said main metadyne primary brush set in opposition to the voltage producing an electric current flow in said main metadyne primary circuit, and means including a sixth field exciting winding energized in accordance with the voltage across said third secondary brush set for providing a component of magnetic excitation along the primary commutating axis of said second auxiliary metadyne dynamo-electric machine.

12. A power system including a prime mover and a main metadyne dynamo-electric machine having an armature driven by said prime mover, means including a primary brush set and a secondary brush set associated with said armature for providing a primary circuit and a secondary circuit therethrough, said secondary brush set being electrically displaced from said primary brush set, a source of substantially constant potential electrical power supply, means connecting said primary brush set to said source of substantially constant potential electrical power supply, an electrical load, means for connecting said electrical load to said secondary brush set, a field exciting winding arranged to produce a component of magnetic excitation along the primary commutating axis of said metadyne dynamo-electric machine, an auxiliary metadyne dynamo-electric machine, means including a second field exciting winding energized in accordance with the current in said secondary circuit for providing a component of magnetic excitation to said auxiliary metadyne dynamo-electric machine, means connecting said auxiliary metadyne dynamo-electric machine across said main metadyne field exciting winding for inducing a component of voltage between said secondary brush set in opposition to the voltage producing an electric current flow therebetween, a third field exciting winding arranged to provide a component of magnetic excitation to said auxiliary metadyne dynamo-electric machine, a regulator generator, means for driving said regulator generator in a predetermined relation to the speed of said prime mover, means for connecting said regulator generator in opposition to the voltage of said source of substantially constant potential electrical power supply and across said third field exciting winding, a fourth field exciting winding arranged to produce a component of magnetic excitation along the secondary commutating axis of said main metadyne dynamo-electric machine, a second auxiliary metadyne dynamo-electric machine, means including a fifth field exciting winding energized in accordance with the current in said primary circuit for providing a component of magnetic excitation to said second auxiliary metadyne dynamo-electric machine, and means connecting said second auxiliary metadyne dynamo-electric machine across said fourth field exciting winding for inducing a component of voltage between said primary brush set in opposition to the voltage producing an electric current flow therebetween.

13. A power system including a prime mover and a main metadyne dynamo-electric machine having an armature driven by said prime mover, means including a primary brush set and a secondary brush set associated with said armature for providing a primary circuit and a secondary circuit therethrough, said secondary brush set being electrically displaced from said primary brush set, a source of substantially constant potential electrical power supply, means for connecting said primary brush set to said source of substantially constant potential electrical power supply, an electrical load, means for connecting said electrical load to said secondary brush set, a field exciting winding arranged to produce a component of magnetic excitation along the primary commutating axis of said main metadyne dynamo-electric machine, an auxiliary metadyne dynamo-electric machine, means including a second field exciting winding energized in accordance with the current in said secondary circuit for providing a component of magnetic excitation to said auxiliary metadyne dynamo-electric machine, means connecting said auxiliary dynamo-electric machine across said main metadyne field exciting winding for inducing a component of voltage between said secondary brush set in opposition to the voltage producing an electric current flow therebetween, a third field exciting winding arranged to provide a component of magnetic excitation to said auxiliary metadyne dynamo-electric machine, a regulator generator, means for connecting said regulator generator in opposition to the voltage of said source of substantially constant potential electrical power supply and across said third field exciting winding, a fourth field exciting winding arranged to provide a component of magnetic excitation to said auxiliary metadyne dynamo-electric machine, means for energizing said fourth field exciting winding in accordance with the current in said primary circuit, a fifth field exciting winding arranged to produce a component of magnetic excitation along the secondary commutating axis of said main metadyne dynamo-electric machine, a second auxiliary metadyne dynamo-electric machine, means including a sixth field exciting winding energized in accordance with the electric current in said primary circuit for providing a component of magnetic excitation to said second auxiliary metadyne dynamo-electric machine, and means connecting said second auxiliary metadyne dynamo-electric machine across said fifth field exciting winding for inducing a component of voltage between said primary brush set in opposition to the voltage producing an electric current flow therebetween.

14. An electrical system including a main metadyne dynamo-electric machine having an armature, means including a primary brush set and a secondary brush set associated with said armature for providing a primary circuit and a secondary circuit therethrough, said secondary brush set being electrically displaced from said primary brush set, a field exciting winding arranged to produce a component of magnetic excitation along the primary commutating axis of said main metadyne dynamo-electric machine, an auxiliary metadyne dynamo-electric machine, means including a second field exciting winding energized in accordance with the electric current in said secondary circuit for providing a component of magnetic excitation to said auxiliary metadyne dynamo-electric machine, means connecting said auxiliary metadyne dynamo-electric machine across said main metadyne field exciting winding for inducing a component of voltage between said secondary brush set in opposition to the voltage producing an electric current flow therebetween, a third field exciting winding arranged to produce a component of magnetic excitation to said auxiliary metadyne dynamo-electric machine, means for energizing said third field exciting winding in accordance with the electrical potential across said secondary brush set, a fourth field exciting winding arranged to produce a component of magnetic excitation along the secondary commutating axis of said main metadyne dynamo-electric machine, a second auxiliary metadyne dynamo-electric machine, means including a fifth field exciting winding energized in accordance with the current in said primary circuit for providing a component of magnetic excitation to said second auxiliary metadyne dynamo-electric machine, means connecting said second auxiliary metadyne dynamo-electric machine across said fourth field exciting winding for inducing a component of voltage between the said primary brush set in opposition to the voltage producing an electric current flow therebetween, a sixth field exciting winding arranged to provide a component of magnetic excitation to said second auxiliary metadyne dynamo-electric machine, means for energizing said sixth field exciting winding in accordance with the voltage across said secondary brush set, a source of substantially constant potential electrical power supply, a seventh field exciting winding arranged to provide a component of magnetic excitation to said second auxiliary metadyne dynamo-electric machine, and means connecting said seventh field exciting winding across said source of electrical power supply for controlling the energization of said seventh field exciting winding.

15. A power system including a prime mover and a main metadyne dynamo-electric machine having an armature driven by said prime mover, means including a primary brush set and a secondary brush set associated with said armature for providing a primary circuit and a secondary circuit therethrough, said secondary brush set being electrically displaced from said primary brush set, an electrical load, means for connecting said electrical load to said secondary brush set, a field exciting winding arranged to produce a component of magnetic excitation along the primary commutating axis of said main metadyne dynamo-electric machine, an auxiliary metadyne dynamo-electric machine, means including a second field exciting winding energized in accordance with the current in said secondary circuit for providing a component of magnetic excitation to said auxiliary metadyne dynamo-electric machine, means connecting said auxiliary metadyne dynamo-electric machine across said main metadyne field exciting winding for inducing a component of voltage between said secondary brush set in opposition to the voltage producing an electric current flow therebetween, a third field exciting winding arranged to provide a component of magnetic excitation to said auxiliary metadyne dynamo-electric machine, a source of substantially constant potential electrical power supply, a regulator generator, means for driving said regulator generator in a predetermined speed relation to the speed of said main metadyne dynamo-electric machine, means for connecting said regulator generator in opposition to the voltage of said source of substantially constant potential electrical power supply and across said third field exciting winding, a fourth field exciting winding arranged to produce a component of magnetic excitation along the secondary commutating axis of said main metadyne dynamo-electric machine, a second auxiliary metadyne dynamo-electric machine, means including a fifth field exciting winding energized in accordance with the current in said primary circuit for providing a component of magnetic excitation to said second auxiliary metadyne dynamo-electric machine, means connecting said second auxiliary metadyne dynamo-electric machine across said fourth field exciting winding for inducing a component of voltage between said primary brush set in opposition to the voltage producing an electric current flow therebetween, a second source of substantially constant potential electrical power supply, a sixth field exciting winding arranged to provide a component of magnetic excitation to said second auxiliary metadyne dynamo-electric machine, and means connecting said sixth field exciting winding across said second source of electrical power supply for controlling the energization of said sixth field exciting winding.

16. A power system including a prime mover and a main metadyne dynamo-electric machine having an armature driven by said prime mover, means including a primary brush set and a secondary brush set associated with said armature for providing a primary circuit and a secondary circuit therethrough, said secondary brush set being electrically displaced from said primary brush set, an electrical load, means for connecting said electrical load to said secondary brush set, a field exciting winding arranged to produce a component of magnetic excitation along the primary commutating axis of said main metadyne dynamo-electric machine, an auxiliary metadyne dynamo-electric machine, means including a second field exciting winding energized in accordance with the current in said secondary circuit for providing a component of magnetic excitation to said auxiliary metadyne dynamo-electric machine, means connecting said auxiliary metadyne dynamo-electric machine across said main metadyne field exciting winding for inducing a component of voltage between said secondary brush set in opposition to the voltage producing an electric current flow therebetween, a third field exciting winding arranged to provide a component of magnetic excitation to said auxiliary metadyne dynamo-electric machine, a fourth field exciting winding arranged to produce a component of magnetic excitation along the secondary commutating axis of said main metadyne dynamo-electric machine, a second auxiliary metadyne dynamo-electric machine, means including a fifth field exciting winding energized in accordance with the current in said primary circuit for providing a component of magnetic excitation to said second auxiliary metadyne dynamo-electric machine, means connecting said second auxiliary metadyne dynamo-electric machine across said fourth field exciting winding for inducing a component of voltage between said primary brush set in opposition to the voltage producing an electric current flow therebetween, a sixth field exciting winding arranged to provide a component of magnetic excitation to said secondary auxiliary metadyne dynamo-electric machine, a regulator generator, means for driving said regulator generator in a predetermined speed relation to the speed of said prime mover, a source of substantially constant potential electrical power supply, and means for connecting said regulator generator in opposition to the voltage of said source of substantially constant potential electrical power supply and to said third field exciting winding and said sixth field exciting winding.

17. A power system including a prime mover and a main metadyne dynamo-electric machine having an armature driven by said prime mover, means including a primary brush set and a secondary brush set associated with said armature for providing a primary circuit and a secondary circuit therethrough, said secondary brush set being electrically displaced from said primary brush set, an electrical load, means for connecting said electrical load to said secondary brush set, a field exciting winding arranged to produce a component of magnetic excitation along the primary commutating axis of said main metadyne dynamo-electric machine, an auxiliary metadyne dynamo-electric machine, means including a second field exciting winding energized in accordance with the electrical current in said secondary circuit for providing a component of magnetic excitation to said auxiliary metadyne dynamo-electric machine, means connecting said auxiliary metadyne dynamo-electric machine across said main metadyne field exciting winding for inducing a component of voltage between said secondary brush set in opposition to the voltage producing an electric current flow therebetween, a third field exciting winding arranged to provide a component of magnetic excitation to said auxiliary metadyne dynamo-electric machine, a source of substantially constant potential electrical power supply, a regulator generator, means for driving said regulator generator in a predetermined speed relation to the speed of said main metadyne dynamo-electric machine, means for connecting said regulator generator in opposition to the voltage of said source of substantially constant potential electrical power supply and across said third field exciting winding, a fourth field exciting winding arranged to provide a component of magnetic excitation to said auxiliary metadyne dynamo-electric machine, a fifth field exciting winding arranged to provide a component of magnetic excitation along the secondary commutating axis of said main metadyne dynamo-electric machine, a second auxiliary metadyne dynamo-electric machine, a sixth field exciting winding arranged to provide a component of magnetic excitation to said second auxiliary metadyne dynamo-electric machine, means connecting said fourth field exciting winding and said sixth field exciting winding in series across said main metadyne machine primary brush set, and means connecting said second auxiliary metadyne dynamo-electric machine across said fifth field exciting winding for inducing a component of voltage between said primary brush set in opposition to the voltage producing an electric current flow therebetween.

GIUSEPPE M. PESTARINI.